(12) United States Patent
Schwabbauer et al.

(10) Patent No.: US 12,270,500 B2
(45) Date of Patent: Apr. 8, 2025

(54) METHOD FOR PRODUCING A FIREWALL

(71) Applicant: Hilti Aktiengesellschaft, Schaan (LI)

(72) Inventors: Laura Schwabbauer, Munich (DE);
Alexander Waldner, Mauerstetten (DE); Christoph Aubauer, Wasserburg (DE); Christian Bleicher, Schondorf am Ammersee (DE); Christian Förg, Buchloe (DE); Mario Paetow, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 177 days.

(21) Appl. No.: 18/042,452

(22) PCT Filed: Aug. 10, 2021

(86) PCT No.: PCT/EP2021/072250
§ 371 (c)(1),
(2) Date: Feb. 21, 2023

(87) PCT Pub. No.: WO2022/043049
PCT Pub. Date: Mar. 3, 2022

(65) Prior Publication Data
US 2024/0026998 A1 Jan. 25, 2024

(30) Foreign Application Priority Data
Aug. 24, 2020 (EP) .................................. 20192423

(51) Int. Cl.
*F16L 5/04* (2006.01)
*A62C 2/06* (2006.01)
*A62C 3/16* (2006.01)

(52) U.S. Cl.
CPC ............. *F16L 5/04* (2013.01); *A62C 2/065* (2013.01); *A62C 3/16* (2013.01)

(58) Field of Classification Search
CPC ... A62C 2/065; A62C 3/16; F16L 5/04; F16L 5/02; H02G 3/0412
(Continued)

(56) References Cited

U.S. PATENT DOCUMENTS 5,099,625 A * 3/1992 Staudt .................... E04B 1/947
52/220.8
2006/0006611 A1 1/2006 Foerg
(Continued)

FOREIGN PATENT DOCUMENTS

EP 3517815 7/2019

OTHER PUBLICATIONS

International Search Report dated Nov. 23, 2021, in PCT/EP2021/072250, with English translation, 5 pages.
(Continued)

*Primary Examiner* — Brent W Herring
(74) *Attorney, Agent, or Firm* — Grüneberg and Myers PLLC

(57) ABSTRACT

A method can be used for producing a firewall in an opening of a building. In this case, at least one fire protection profile is used which contains a tube made of a composite material, which is filled with a fire protection material. The fire protection profile is designed such that it can be combined with an adjacent fire protection profile in the event of a fire. In order to produce the firewall, it is first transferred into an at least partially compressed state or provided in such a state. The fire protection profile is then introduced into the opening, with the at least partially compressed state being maintained. The fire protection profile is subsequently released so that it is decompressed at least partially and at least in portions.

11 Claims, 4 Drawing Sheets

(58) Field of Classification Search
USPC .................................................. 52/220.8, 232
See application file for complete search history.

(56) References Cited

U.S. PATENT DOCUMENTS

| | | | |
|---|---|---|---|
| 2007/0289235 A1* | 12/2007 | Hansen | A62C 3/16 52/309.7 |
| 2014/0007373 A1* | 1/2014 | Muenzenberger | H02G 3/0412 16/2.2 |
| 2017/0260741 A1* | 9/2017 | Ackerman | A62C 2/065 |
| 2018/0306352 A1 | 10/2018 | Albers | |
| 2020/0199867 A1* | 6/2020 | Ackerman | E04B 1/947 |
| 2021/0146173 A1 | 5/2021 | Förg | |

OTHER PUBLICATIONS

Written Opinion dated Nov. 23, 2021, in PCT/EP2021/072250, with English translation, 8 pages.

* cited by examiner

METHOD FOR PRODUCING A FIREWALL

CROSS-REFERENCE TO RELATED APPLICATIONS

This application is the National Stage entry under § 371 of International Application No. PCT/EP2021/072250, filed on Aug. 10, 2021, and which claims the benefit of priority to European Application No. 20192423.0, filed on Aug. 24, 2020. The content of each of these applications is hereby incorporated by reference in its entirety.

BACKGROUND OF THE INVENTION

Field of the Invention

The invention relates to a method for producing a firewall in an opening in a structure.

Description of Related Art

Such firewalls serve to seal, in terms of fire protection, the opening that connects portions of the structure. In particular, this prevents smoke and/or flames from passing through the opening. The two portions of the structure are thus isolated from one another in this respect.

It is known to arrange block-shaped or pillow-shaped materials in the opening to be sealed. Such materials and fire protection elements made therefrom are known, for example, from DE 43 25 966 A1, WO 99/38932 A1 and WO 2005/003254 A1. It is customary to geometrically adapt the fire protection elements to the associated opening, for example by cutting them to size.

The firewall must rest tightly against the boundary surfaces of the opening in order to achieve an effective sealing effect. However, this requirement is in conflict with easy installation of the fire protection elements forming the firewall, i.e. easy manufacturability of the firewall.

SUMMARY OF THE INVENTION

The object of the present invention is therefore to provide a method for producing a firewall that resolves or at least alleviates this conflict of objectives. It should therefore be possible to easily arrange the fire protection elements forming the firewall in the opening to be sealed. At the same time, they should reliably seal the opening in terms of fire protection.

The object is achieved by a method for producing a firewall in an opening in a building, at least one fire protection profile being used which comprises a tube made of a composite material, which is filled with a fire protection material, the composite material comprising an inorganic fiber material which is connected to a film, and the fire protection profile being designed such that it can be combined with an adjacent fire protection profile in the event of a fire. The method comprises the following steps:
 a) transferring the fire protection profile into an at least partially compressed state or providing the fire protection profile in an at least partially compressed state,
 b) introducing the fire protection profile into the opening, the at least partially compressed state being maintained, and
 c) subsequently releasing the fire protection profile so that it is decompressed at least partially and at least in portions.

The fire protection profile is therefore elastically deformable. This means that in particular the fire protection material must also be elastically deformable. In the compressed state, the fire protection profile is somewhat smaller, at least in one of its dimensions, than the portion of the opening to be sealed in terms of fire protection by means of the fire protection profile. This makes it easy to arrange the fire protection profile at the appropriate point in the opening. In this context, a partially compressed state relates to a state in which the fire protection profile is compressed only in one portion, i.e. locally. Other portions of the fire protection profile can be uncompressed. A distinction must be made between the severity or degree of compression. In this aspect, partial, incomplete compression can be sufficient to achieve the above-mentioned effect. As a result of the release and subsequent decompression, the fire protection profile is reliably applied to the boundary surfaces of the opening and/or adjacent fire protection profiles. This results in a reliable fire protection effect.

A fire protection profile which comprises a tube made of a composite material, which is filled with a fire protection material, the composite material comprising an inorganic fiber material which is connected to a film, is particularly suitable for a method according to the invention, since it can be easily compressed. It can also be compressed in a defined way by the tube made of composite material. It therefore substantially retains its shape even in its compressed state. In other words, such a fire protection profile does not deform in an undesired and/or unpredictable manner. In an alternative embodiment, it is also possible for the fiber material to be present next to the film or to be fixed with the film over the fire protection material.

The fact that the fire protection profile is designed to be combined with an adjacent fire protection profile in the event of a fire creates a firewall that is particularly tight.

The fire protection material of the fire protection profile preferably comprises an intumescent material. Such a material increases in volume under the action of heat. This results in further improved sealing of the opening in terms of fire protection.

DETAILED DESCRIPTION OF THE INVENTION

Figure 1:
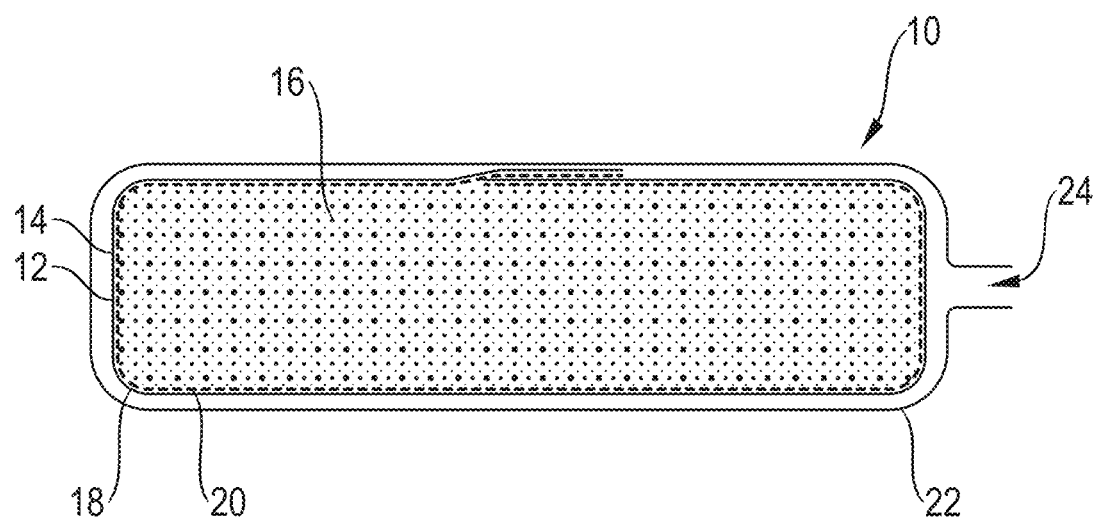
FIG. 1 shows a fire protection profile for use in a method according to the invention for producing a firewall in an uncompressed state.

According to an embodiment, the inorganic fiber material is a woven fabric, a knitted fabric or a non-woven fabric. The fire protection profile is therefore kept in a predetermined form both in the compressed state and in the uncompressed state.

The fiber material advantageously comprises glass fibers, basalt fibers or ceramic fibers. Such fibers have sufficient strength for the present application. They are also substantially fire-resistant.

The fibers of the fiber material can also include combustible fibers. In the event of a fire, the combustible fibers open up paths through which the fire protection material can expand and through which adjacent fire protection profiles can be combined. The non-combustible fibers meanwhile ensure the desired dimensional stability of the fire protection profile.

In this context, the fire protection profile has, for example, a rectangular cross section.

A plurality of holes can also be provided in the fiber material. The fire protection material, in particular if it is an intumescent material, can thus escape through these holes in the event of a fire and ensure that the opening is reliably sealed. Furthermore, the combining can take place through these holes.

In the event that a firewall is to be produced in a comparatively narrow gap, the fire protection profile can be provided as a profile strip that is pushed into the narrow gap. Such firewalls are well suited, for example, for sealing the edges of fire damper assemblies in terms of fire protection.

In one variant, the fire protection profile is provided in an at least partially compressed state by the fire protection profile being provided inside a vacuum envelope under exclusion of air. Such fire protection profiles can be reduced in one of their dimensions, in comparison with their uncompressed state, by 30% to 70%, for example by 40%. This makes them particularly easy to insert into the opening. In addition, when installing the fire protection profile, care does not have to be taken to maintain the compressed state.

In this context, the fire protection profile is released by opening or creating an air inlet in the vacuum envelope. This creates a possibility for ambient air to flow into the interior of the vacuum envelope. As a result, the fire protection profile is at least partially decompressed. The air inlet is advantageously arranged in such a way that it is easily accessible when the associated fire protection profile is installed. It is also possible that no defined air inlet is provided on the vacuum envelope, but instead that such an air inlet is created, for example, by means of a tool, by the vacuum envelope being locally opened, for example pierced.

At least two fire protection profiles can also be used to produce the fire barrier, the fire protection profiles differing in length, height and/or width. This allows the firewall to be easily and reliably adapted to a given geometry of the opening. Of course, more than two fire protection profiles can also be used. Differently dimensioned fire protection profiles can also be used to create different fire-resistance durations.

The opening can be penetrated by at least one line. A fire protection profile can thus be used in a region surrounding the line that has a greater width than in other regions of the opening. The greater width results in an increased installation depth of the fire protection profile around the line. This increases the fire-resistance duration.

In an alternative, the fire protection profile is converted into the at least partially compressed state by being rolled up. This way of compressing the fire protection profile is particularly easy to implement. This applies in particular to construction site environments. The compressed state is maintained by manually holding the fire protection profile in the rolled state. It is also conceivable to maintain this state by means of a tape that is tied around the rolled fire protection profile. The fire protection profile is then inserted into the opening in the rolled-up state. As soon as the fire protection profile is no longer held manually or by the tape, it is at least partially decompressed.

In addition, the low friction of the films against one another makes it possible to wind up the tube that is compressed by being rolled up. In general, this is otherwise not possible due to the friction of the compressed material against itself. This design also allows temporary fixing options for easier installation.

At least one line extending through the opening can be installed by being pushed between two adjacent layers of the fire protection profile or two adjacent fire protection profiles. This is particularly easy with a rolled fire protection profile. At the same time, there is a good fire protection seal around the line.

It is also possible for a line that reaches through the opening in its installed state to be wrapped by means of the fire protection profile. In particular, the line is wrapped by means of the fire protection profile before it reaches through the opening. In other words, the fire protection profile is rolled up or wound onto the line. In this case, the line is a winding core. In this context, reference is made to a bandage for the line. The combination of cable and fire protection profile is inserted into the opening.

The fire protection profile is preferably only incompletely decompressed as a result of the release, so that in the installed state it can compensate for an expansion movement of the opening by further decompression. The elastic deformability of the fire protection profile is therefore substantially retained over the entire service life of the firewall. The firewall thus also offers a reliable fire protection seal when the opening increases due to movements within the structure. This makes it particularly reliable.

Figure 2:
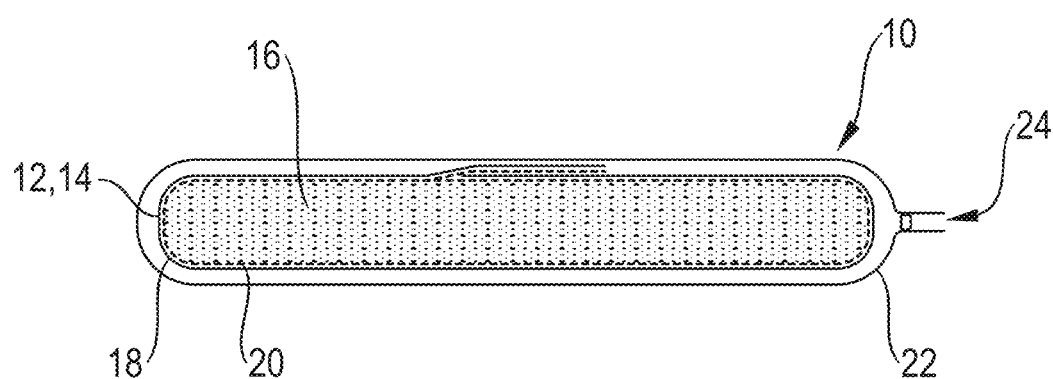
FIG. 2 shows the fire protection profile from FIG. 1 in a compressed state.
Figure 3:
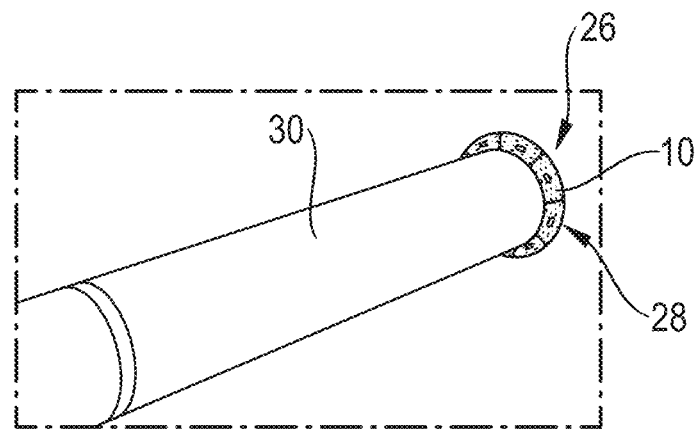
FIG. 3 shows a firewall which was produced by means of a method according to the invention using the fire protection profile from FIGS. 1 and 2.
Figure 4:
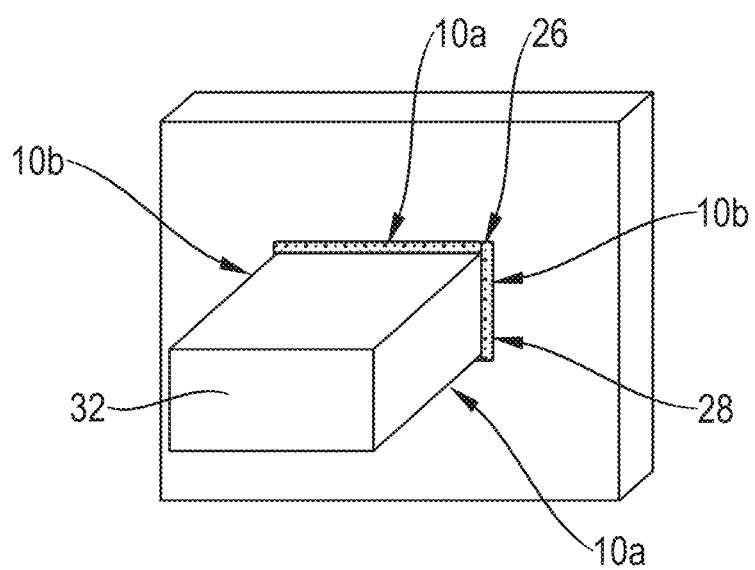
FIG. 4 shows an alternative firewall which was also produced by means of a method according to the invention and using fire protection profiles according to FIGS. 1 and 2.
Figure 5:
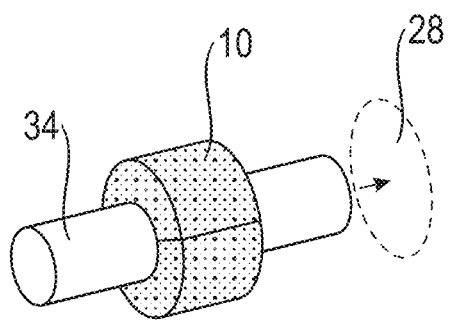
FIG. 5 shows an assembly consisting of a fire protection profile and a line, the fire protection profile being wrapped around the line to form a firewall.
Figure 6:
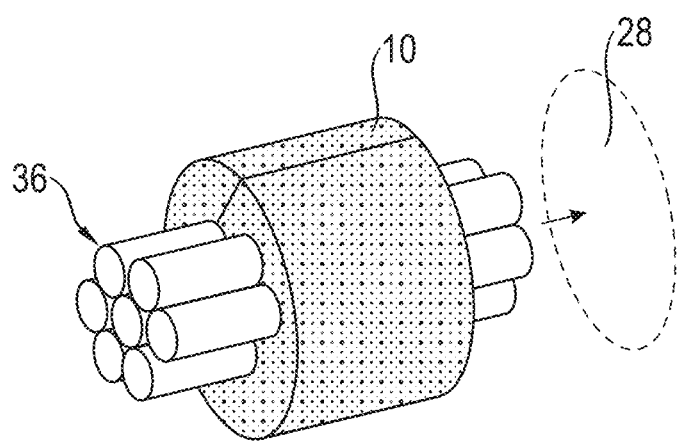
FIG. 6 shows an assembly consisting of a fire protection profile and a line bundle, the fire protection profile being wrapped around the line bundle to form a firewall.
Figure 7:
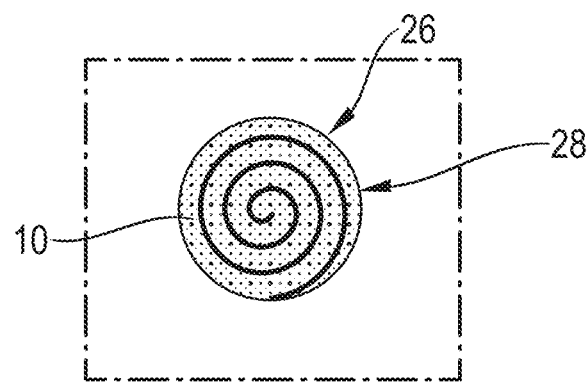
FIG. 7 shows a firewall according to a further embodiment which was produced by means of a method according to the invention using the fire protection profile from FIGS. 1 and 2.
Figure 8:
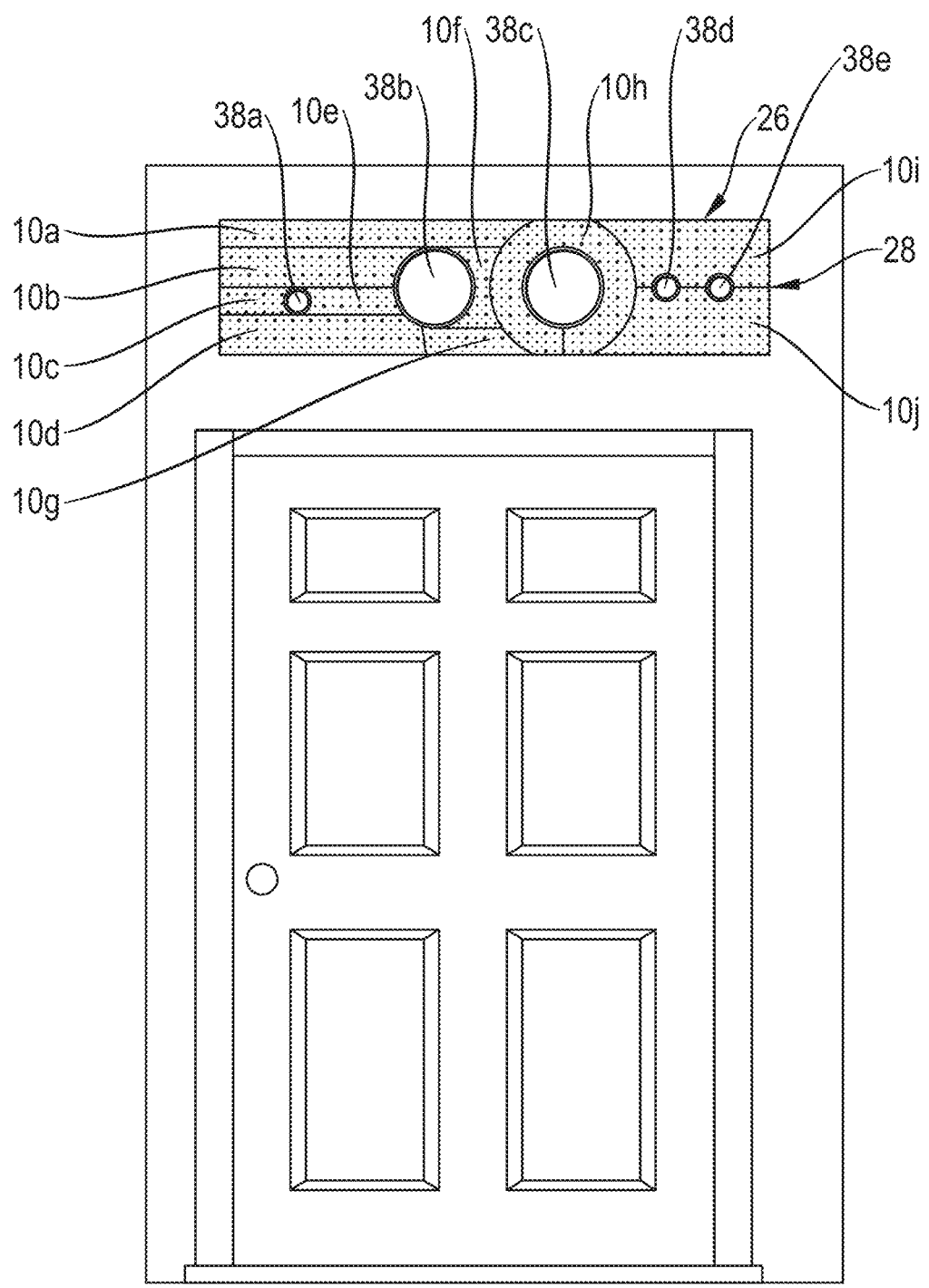
FIG. 8 shows a firewall according to yet another embodiment, which was produced by means of a method according to the invention using a plurality of fire protection profiles according to FIGS. 1 and 2.

The invention is explained below with reference to various embodiments which are shown in the accompanying drawings, in which:

FIG. 1 shows a fire protection profile for use in a method according to the invention for producing a firewall in an uncompressed state, FIG. 2 shows the fire protection profile from FIG. 1 in a compressed state, FIG. 3 shows a firewall which was produced by means of a method according to the invention using the fire protection profile from FIGS. 1 and 2, FIG. 4 shows an alternative firewall which was also produced by means of a method according to the invention and using fire protection profiles according to FIGS. 1 and 2, FIG. 5 shows an assembly consisting of a fire protection profile and a line, the fire protection profile being wrapped around the line to form a firewall, FIG. 6 shows an assembly consisting of a fire protection profile and a line bundle, the fire protection profile being wrapped around the line bundle to form a firewall, FIG. 7 shows a firewall according to a further embodiment which was produced by means of a method according to the invention using the fire protection profile from FIGS. 1 and 2, and FIG. 8 shows a firewall according to yet another embodiment, which was produced by means of a method according to the invention using a plurality of fire protection profiles according to FIGS. 1 and 2.

FIG. 1 and FIG. 2 schematically show a fire protection profile 10 which can be used in a method for producing a firewall in an opening in a building.

The fire protection profile 10 comprises a tube 12 made of a composite material 14, which is filled with a fire protection material 16.

The fire protection material 16 is an intumescent material in the form of an elastically deformable foam.

The composite material 14 is composed of a film 18 and an inorganic fiber material 20. In FIGS. 1 and 2, the film 18 is shown by a continuous line and the fiber material 20 by a dashed line.

The fiber material 20 can be a woven fabric, a knitted fabric or a non-woven fabric, in particular made of glass fibers, basalt fibers or ceramic fibers.

If a certain temperature is exceeded, for example in the event of a fire, the fire protection material 16 expands and can exit the tube 12 through the composite material 14.

If a plurality of fire protection profiles 10 are used within a firewall, the fire protection profiles 10 adjacent to one another can be combined. This achieves particularly reliable fire protection.

The fire protection profile 10 is arranged within a vacuum envelope 22.

In this case, in the uncompressed state of the fire protection profile 10 shown in FIG. 1, an air inlet 24 of the vacuum envelope 22 is open.

FIG. 2 shows the fire protection profile 10 in a compressed state. Starting from the uncompressed state, air was sucked out of the interior of the vacuum envelope 22. As a consequence of this, the fire protection profile 10 was compressed in a direction running vertically in FIGS. 1 and 2, i.e. was reduced in height.

In the compressed state, the fire protection profile 10 is held in the interior of the vacuum envelope 22 under exclusion of air. The air inlet 24 is closed for this purpose.

FIG. 3 shows a firewall 26 which is provided in an opening 28 of a structure.

The opening 28 is also penetrated by a line 30 in the form of a tube.

The firewall 26 is produced using the fire protection profile 10 as follows.

First, the fire protection profile 10 is provided in its compressed state (see FIG. 2).

The fire protection profile 10 is then introduced into the annular slit which extends around the line 30. The compressed state is retained in the process.

The fire protection profile 10 is then released so that it is decompressed. The air inlet 24 is opened for this purpose.

As a result, the fire protection profile 10 assumes a partially compressed state in which it rests both on the line 30 and on an outer contour of the opening 28.

In the event that relative movements occur between the line 30 and the opening 28 over the service life of the firewall 26, these can be compensated for by further decompressing the fire protection profile 10.

An alternative firewall 26 can be seen in FIG. 4.

Here, in contrast to FIG. 3, a cross section of the opening 28 is substantially rectangular. It is traversed by a line 32, likewise substantially rectangular in cross section, in the form of a ventilation duct.

The firewall 26 is now constructed from a total of four fire protection profiles 10.

The slits formed on an upper side and on an underside of the line 32 by the line 32 and the opening 28 are each filled with a fire protection profile 10 of a first length. These fire protection profiles 10 are denoted by 10*a* in FIG. 4.

The slits extending on each side of the line 32 are each filled with a fire protection profile 10 of a second length. The second length is smaller than the first length. These fire protection profiles 10 are denoted by 10*b* in FIG. 4.

The introduction of the fire protection profiles 10*a*, 10*b* into the assigned portions of the opening 28, i.e. into the slits, takes place as already explained in connection with FIG. 3. Reference is therefore made to the above statements.

As an alternative to the variants shown in FIGS. 3 and 4, the firewall 26 can also be produced by a line 34 or a bundle of lines 36 being wrapped in a fire protection profile 10 (see FIGS. 5 and 6).

As an alternative to the fire protection profile 10 from FIGS. 1 and 2, a fire protection profile 10 that does not have a vacuum envelope 22 can also be used. Such a fire protection profile 10 is then compressed by being wound around the line 34 or the line bundle 36 under tension.

In the following, the line 34, together with the fire protection profile 10, or the line bundle 36, together with the fire protection profile 10, is pushed into the associated opening 28 (see arrows in FIGS. 5 and 6).

There, the compressed state of the particular fire protection profile 10 is released either by opening the air inlet 24 in the vacuum envelope 22 or by removing the tension introduced into the fire protection profile 10 during wrapping in such a way that said fire protection profile can be at least partially unwound from the line 34 or the line bundle 36.

FIG. 7 also shows an alternative firewall 26 which is provided in an opening 28 having a substantially circular cross section.

In order to produce this firewall 26, a fire protection profile 10, which, in contrast to the fire protection profile 10 shown in FIGS. 1 and 2, is designed without a vacuum envelope 22, is first rolled up and thus compressed.

Subsequently, in the rolled-up state, it is pushed into the opening 28 and released there in such a way that it can unroll again at least in portions.

Optionally, one or more lines (not shown in FIG. 7) can then be pushed through the opening 28 between the layers of the fire protection profile 10.

A further firewall 26 is shown in FIG. 8. This is arranged in an opening 28 which is provided in a wall portion above a door of a building. Such an opening 28 is used to lay supply lines in the form of cables and pipes to individual households or building sections. This use case is often referred to as letterbox opening or simply letterbox.

In the embodiment shown, the opening 28 is penetrated by a total of five lines 38*a* to 38*e*.

The firewall 26 is made up of ten fire protection profiles 10*a* to 10*j*. These differ in length and height.

In addition, the fire protection profile 10*h* surrounding the line 38*c* is deeper than the other fire protection profiles 10*a* to 10*g*, 10*i*, 10*j*, so that an increased fire resistance duration results in the region surrounding the line 38*c*.

Each of the fire protection profiles 10a to 10j is inserted in its compressed state into the opening 28 in accordance with the explanations relating to FIG. 3 and then released so that it is decompressed.

All the fire protection profiles 10a to 10j are only incompletely decompressed as a result of the release.

Any expansion movements of the opening 28 that may occur, which result from movements of adjacent elements of the building, can thus be compensated for by further decompressing one or more of the fire protection profiles 10a to 10j.

This is of practical importance in particular when the opening 28 extends up to a ceiling of the structure. The firewall 26 can then compensate for relative movements between the wall in which the opening 28 is provided and the adjacent ceiling.

In the same way, the firewall 26 from FIG. 8 can also be used in a so-called head-of-wall joint. i.e. in a joint that is present between an upper end of a wall and an adjoining ceiling.

The invention claimed is:

1. A method for producing a firewall in an opening of a building,
   the method comprising:
   introducing at least one fire protection profile in an at least partially compressed state into the opening, wherein the at least one fire protection profile is inside a vacuum envelope under exclusion of air, wherein the at least one fire protection profile comprises a tube made of a composite material inside the vacuum envelope, wherein the tube is filled with a fire protection material, wherein the composite material comprises an inorganic fiber material which is connected to a film, and wherein the at least one fire protection profile is designed to be combined with an adjacent fire protection profile in the event of a fire, and
   subsequently releasing the at least one fire protection profile so that the at least one fire protection profile is decompressed at least partially and at least in portions,
   wherein the vacuum envelope is compressed in the at least partially compressed state.

2. The method according to claim 1, wherein the at least one fire protection profile is released by opening or creating an air inlet in the vacuum envelope.

3. The method according to claim 1, wherein the at least one fire protection profile comprises at least two fire protection profiles, and the at least two fire protection profiles differ in length, height, and/or width.

4. The method according to claim 3, wherein the opening is penetrated by at least one line, and
   in a region surrounding the at least one line, the at least one fire protection profile has a greater width than in other regions of the opening.

5. The method according to claim 1, wherein the at least one fire protection profile is converted into the at least partially compressed state by being rolled up.

6. The method according to claim 1, wherein at least one line extending through the opening is installed by being pushed between two adjacent layers of the at least one fire protection profile or two adjacent fire protection profiles of the at least one fire protection profile.

7. The method according to claim 1, wherein a line, which in an installed state extends through the opening, is wrapped by the at least one fire protection profile.

8. The method according to claim 7, wherein the line is wrapped by the at least one fire protection profile before extending through the opening.

9. The method according to claim 1, wherein the at least one fire protection profile is only incompletely decompressed as a result of the releasing, so that in an installed state the at least one fire protection profile can compensate for an expansion movement of the opening by further decompression.

10. The method according to claim 1,
    wherein the vacuum envelope does not comprise an air inlet when introducing at least one fire protection profile into the opening; and
    wherein subsequently releasing the at least one fire protection profile comprises creating an air inlet in the vacuum envelope.

11. The method according to claim 10, wherein creating the air inlet in the vacuum envelope comprises piercing the vacuum envelope with a tool.

* * * * *